(12) United States Patent
Wang et al.

(10) Patent No.: US 8,253,554 B2
(45) Date of Patent: Aug. 28, 2012

(54) MULTI-PURPOSE ATTACHABLE ALARM

(75) Inventors: Ying Wang, Harbin (CN); Dianxin Li, Harbin (CN)

(73) Assignee: Empire Technology Development LLC, Wilmington, DE (US)

( * ) Notice: Subject to any disclaimer, the term of this patent is extended or adjusted under 35 U.S.C. 154(b) by 407 days.

(21) Appl. No.: 12/538,881

(22) Filed: Aug. 11, 2009

(65) Prior Publication Data

US 2011/0037585 A1    Feb. 17, 2011

(51) Int. Cl.
*G08B 1/08* (2006.01)

(52) U.S. Cl. .................. 340/539.1; 340/539.11; 340/540

(58) Field of Classification Search ................ 340/539.1
See application file for complete search history.

(56) References Cited

U.S. PATENT DOCUMENTS

| | | | |
|---|---|---|---|
| 248,551 A | 10/1881 | Baumgartner | |
| 340,500 A | 4/1886 | Fraser | |
| 5,963,131 A * | 10/1999 | D'Angelo et al. | 340/568.1 |
| 6,219,949 B1 | 4/2001 | Pang | |
| 6,438,393 B1 * | 8/2002 | Suuronen | 455/575.1 |
| 6,570,503 B1 * | 5/2003 | Ulert et al. | 340/573.1 |
| 2003/0062999 A1 * | 4/2003 | Saleh et al. | 340/541 |
| 2004/0145471 A1 * | 7/2004 | Lawrenson et al. | 340/539.21 |
| 2006/0261931 A1 * | 11/2006 | Cheng | 340/426.1 |
| 2008/0074262 A1 * | 3/2008 | Paulkovich | 340/572.1 |
| 2009/0040052 A1 * | 2/2009 | Cameron et al. | 340/573.1 |
| 2009/0085754 A1 * | 4/2009 | Myllymaki | 340/584 |
| 2010/0097205 A1 * | 4/2010 | Script | 340/539.1 |

* cited by examiner

*Primary Examiner* — George Bugg
*Assistant Examiner* — Kerri McNally
(74) *Attorney, Agent, or Firm* — Ren-Sheng International

(57) ABSTRACT

A multi-purpose alarm operates in a motion-detected alarm mode and a motion-expected alarm mode. In the motion-detected alarm mode, when the multi-purpose alarm is touched or moved, an alarm is issued. In the motion-expected alarm mode, when the multi-purpose alarm has not been touched or moved for a period of time, an alarm is issued. The multi-purpose alarm employs an accelerometer to sense the presence or absence of movement and is attachable to an object being monitored through various attachment means including a spring clamp, an adhesive, and a magnet.

11 Claims, 3 Drawing Sheets

MULTI-PURPOSE ATTACHABLE ALARM

BACKGROUND

Unless otherwise indicated herein, the approaches described in this section are not prior art to the claims in this application and are not admitted to be prior art by inclusion in this section.

Building alarm systems, such as for homes and businesses, and vehicle alarm systems are commonplace. However, these alarm systems are complex and expensive to deploy. Another issue with such alarm systems is that it is application specific. An alarm system purchased for a home cannot be deployed in vehicles and vice versa. As a result, the market for alarm systems has been limited. A less complex alarm system would likely see increased usage in private homes and a less costly alarm system would likely be used on personal items such as laptops, cell phones, and other items considered to be of value. Making the alarm systems multi-purpose would also increase their marketability.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
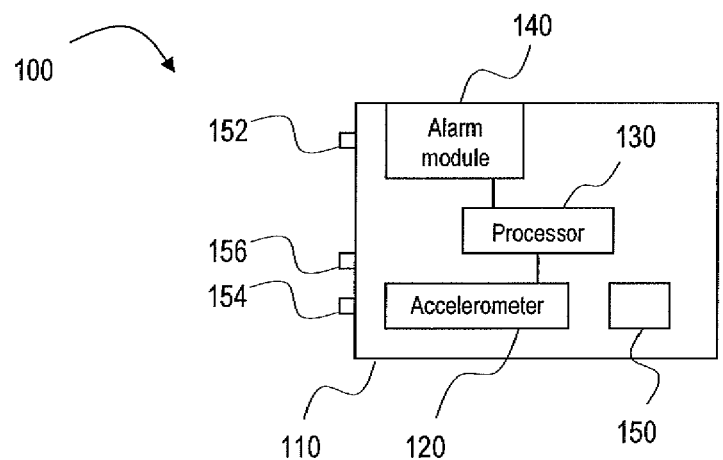
FIG. 1 is a multi-purpose alarm according to a first embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to a multi-purpose alarm, and more particularly to a multi-purpose alarm that has an attachment portion by which it can be attached to various objects.

FIG. 1 is a multi-purpose alarm according to a first embodiment of the present disclosure. Multi-purpose alarm 100 includes a casing 110 which houses a micro-circuit board (not shown) to which accelerometer 120, a processor 130, an alarm module 140, and a power supply module 150 are mounted. Inputs elements 152, 154, 156 allow the user to adjust certain settings of multi-purpose alarm 100. Input element 152 is a toggle button that switches multi-purpose alarm 100 between a first mode of operation and a second mode of operation. Input element 154 is a knob by which a threshold acceleration level is adjusted up or down. Input element 156 is a knob by which a timer setting is adjusted up or down. An example accelerometer 120 may be a Micro-Electro-Mechanical System (MEMS) accelerometer MXC6202 from MEMSIC, Inc., and an example processor 130 may be from Atmel.

The first mode of operation is a motion-detected alarm mode. When multi-purpose alarm 100 is touched or moved, and the acceleration sensed by accelerometer 120 is greater than the threshold acceleration level, an alarm is issued through alarm module 140. This mode can be used, for example, as a home alarm system when attached to windows or as vehicle alarm system. The second mode of operation is a motion-expected alarm mode. When multi-purpose alarm 100 has not been touched or moved for a period of time that exceeds the timer setting, an alarm is issued through alarm module 140. This mode can be used, for example, to alert a person who is ironing that the iron has remained motionless for a while. This would prevent the iron from damaging the clothing being ironed.

In the first mode operation, processor 130 is programmed to carry out the determination of the alarm conditions based on the acceleration sensed by accelerometer 120 and the threshold acceleration level set by the user. In the second mode of operation, processor 130 is programmed to carry out the determination of the alarm conditions based on the absence of meaningful acceleration sensed by accelerometer 120 (e.g., sensed acceleration <0.01 g) for a predetermined amount of time that exceeds the timer setting.

Alarm module 140 receives a control signal from processor 130 and issues an alarm. The alarm may be an audible alarm, a visible alarm, a signaling alarm, or a combination of these. In one embodiment, alarm module 140 is an acousto-optic alarm module that generates a high-decibel acousto-optic alarm. In another embodiment, alarm module 140 is an audio module that plays back previously recorded audio or a voice prompt. In yet another embodiment, alarm module 140 is a buzzer module that vibrates casing 110 on which it is mounted. A signaling alarm is issued when alarm module 140 is a wireless transmission module. In that embodiment, when alarm module 140 receives the control signal from processor 130, it wirelessly transmits an alarm signal to a central monitoring station (or generally a base station). In still other embodiments, one or more of the different alarm modules described above can be combined and integrated on a single board or chip.

Figure 2:
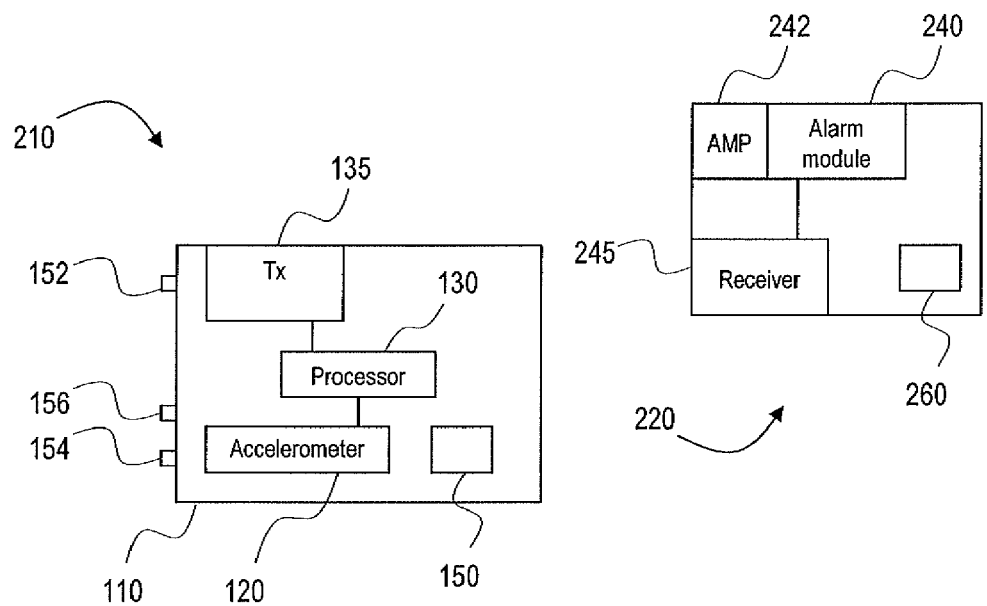
FIG. 2 is a multi-purpose alarm according to a second embodiment of the present disclosure.

FIG. 2 is a multi-purpose alarm according to a second embodiment of the present disclosure. In this embodiment, the multi-purpose alarm comprises two physically separate units 210, 220. First unit 210 is the same as multi-purpose alarm 100 of FIG. 1 with the alarm module 140 replaced by a wireless transmission module 135. When wireless transmission module 135 receives a control signal from processor 130, it wirelessly transmits the control signal to second unit 220. Second unit 220 receives the control signal through a wireless receiver module 245 and passes the control signal to alarm module 240. Alarm module 240 has the same features and operates in the same manner as alarm module 140 of FIG. 1. An amplifier 242 is provided to increase the range of any audible alarms generated by alarm module 240. Power supply module 260 powers the components of second unit 220.

Figure 3:
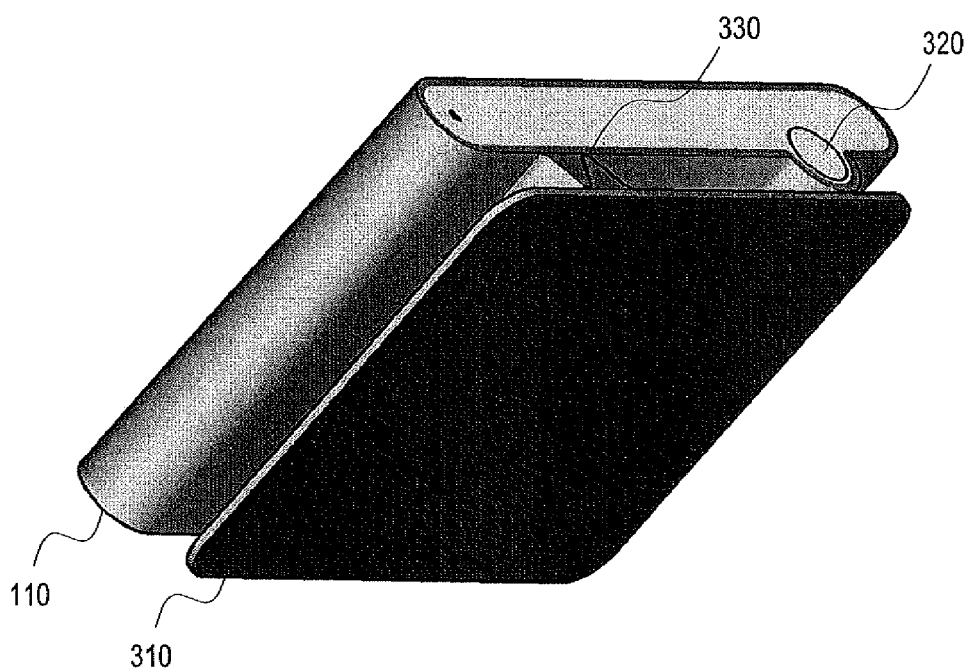
FIG. 3 is a perspective view of a first casing design used in the multi-purpose alarm of either FIG. 1 or FIG. 2.

One of the features of the multi-purpose alarm of either FIG. 1 or FIG. 2 is that it is easily attachable to an object through an attachment portion formed on casing 110. FIG. 3 is a perspective view of a first casing design used in the multi-purpose alarm of either FIG. 1 or FIG. 2. As shown, a spring clamp is formed on a primary surface of casing 110. The spring clamp includes a planar section 310, a resilient hinge 320 that connects planar section 310 to casing 110, and a clamping portion 330. In an alternative embodiment, planar section 310 is made of magnetic material so that a user can attach the multi-purpose alarm to an object using clamping portion 330 or by magnetic force.

Figure 4:
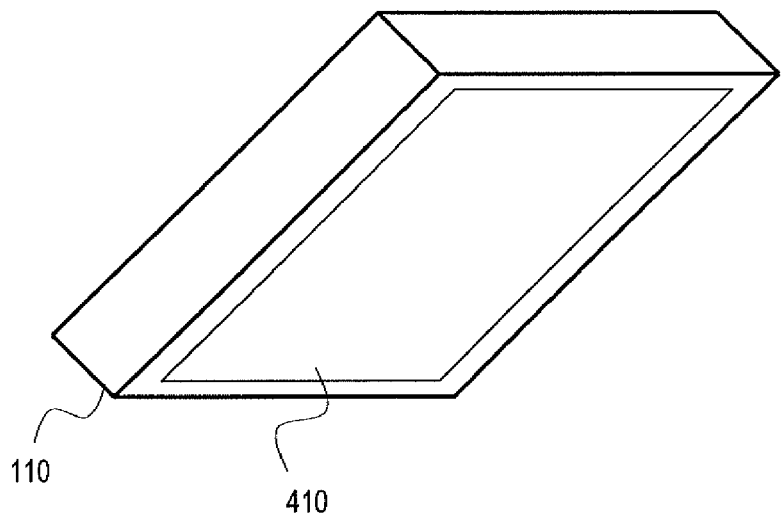
FIG. 4 is a schematic diagram of a second casing design used in the multi-purpose alarm of either FIG. 1 or FIG. 2.

FIG. 4 is a schematic diagram of a second casing design used in the multi-purpose alarm of either FIG. 1 or FIG. 2. In this design, a layer of either adhesive or magnetic strip material 410 may be provided on a primary surface of casing 110, and the multi-purpose alarm is attached to an object by either adhesive force or magnetic force.

Figure 5A:
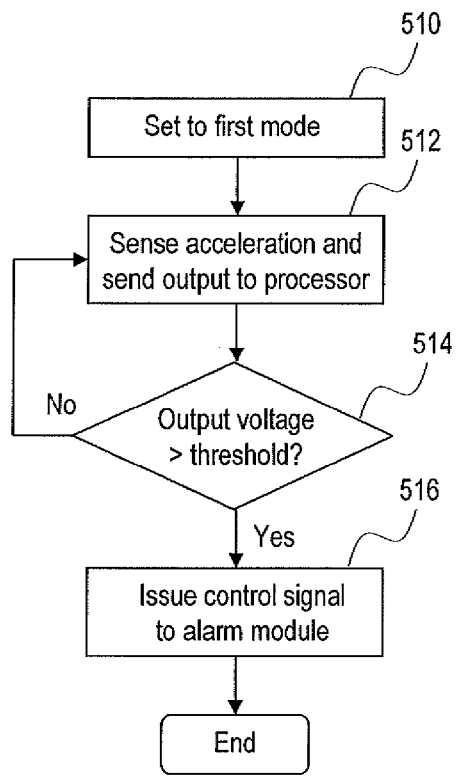
FIG. 5A is a flow diagram of the multi-purpose alarm of either FIG. 1 or FIG. 2 operating in a first mode.

FIG. 5A is a flow diagram of the multi-purpose alarm of either FIG. 1 or FIG. 2 operating in a first mode. The process begins with Operation 510 where the processor is set to the first mode. This may occur upon power ON or if a user actuates the toggle button to switch from the second mode to the first mode. Operation 512 is carried out by the accelerometer to sense the acceleration and output a voltage signal that is proportional to the acceleration. The processor carries out Operation 514 to determine if the voltage level of the output voltage signal exceeds a threshold. If it does, the processor issues a control signal to the alarm module (Operation 516) and the process ends. If it does not, the process flow returns to Operation 512.

Figure 5B:
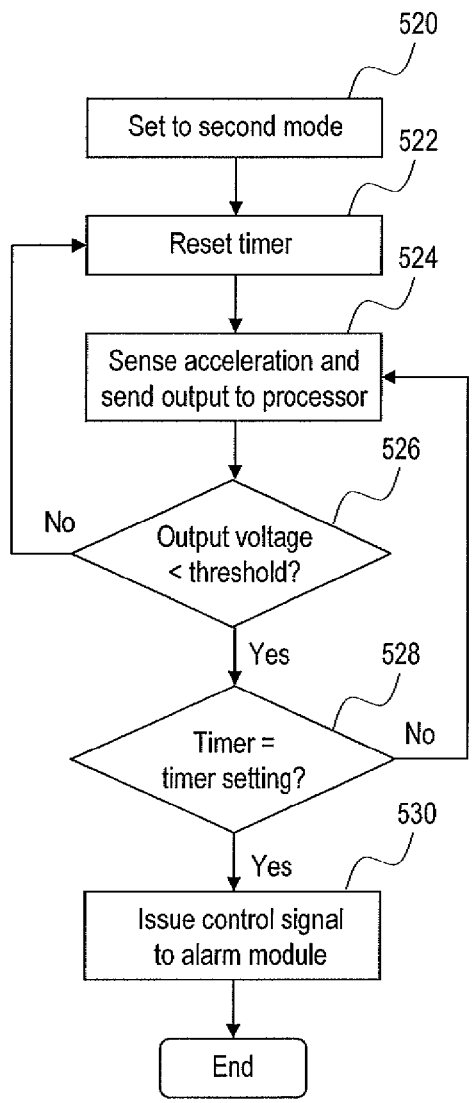
FIG. 5B is a flow diagram of the multi-purpose alarm of either FIG. 1 or FIG. 2 operating in a second mode.

FIG. 5B is a flow diagram of the multi-purpose alarm of either FIG. 1 or FIG. 2 operating in a second mode. The process begins with Operation 520 where the processor is set to the second mode. This may occur upon power ON or if a user actuates the button to switch from the first mode to the second mode. Then, a timer is reset to 0 and turned ON (Operation 522). Operation 524 is carried out by the accelerometer to sense the acceleration and output a voltage signal that is proportional to the acceleration. The processor then determines if the voltage level of the output voltage signal is below a threshold (Operation 526) and if the timer value is greater than the timer setting (Operation 528). If the voltage level of the output voltage signal is not below a threshold, meaning that the object to which the multi-purpose alarm is attached has been moved by a meaningful amount, the process flow returns to Operation 522 where the time is reset to 0. If the voltage level of the output voltage signal is below a threshold but the timer value is still less than the timer setting, the process flow returns to Operation 524. If both conditions in Operations 526 and 528 are met, the processor issues a control signal to the alarm module (Operation 530) and the process ends.

The multi-purpose alarm described above has many potential applications. It is applicable to all anti-theft situations. For instance, a user may attach the device to notebook PCs, doors, home appliances, vehicles, windows, or hazardous household objects.

The benefits of this device are many. It is very easy to use, extremely applicable, low cost, small, easy to store and carry, and expandable with adhesive, clamps, magnetic strip. It also provides for personalized voice prompts and adjustable alarm precision. It can enhance household objects with light and voice alarm functionality.

Some of the applications of this device are as follows:

1. An overflow warning on cooking pots. It is very common that a rice or soup cooker overflows and causes a mess, or even worse, a fire or gas leak. If this device is attached to the cover, it can generate a pre-recorded voice prompt as soon as the cooker cover begins to vibrate so that no one has to wait by the stove.

2. Handy reminder. When operating in the motion-expected mode, this device can be attached to utility bills to remind its owner to pay the bill before leaving home.

3. Theft prevention. The alarm module can be shaped into a watch and worn. Once the monitored object is touched or moved, the user will be warned of possible theft of the monitored object.

4. Iron guard. Once a clothing iron has been motionless for a certain period of time, the alarm or voice prompt will sound from this device and bring the potential hazard to the user's attention.

5. Child care. Young children have been known to accidentally slip through open windows, especially when adults turn their backs for a second. By attaching this device to the window, any movement of the window by a child can be detected and the audio module carried or worn by the parents can warn them via a pre-recorded message.

6. Diet control. Many individuals have difficulty controlling their diet for health reasons. Overindulgence in food or alcohol is a common occurrence, but attaching a multi-purpose alarm with a recorded message to the refrigerator door, "Honey, drinking is not good for your health!" may help the person abstain from drinking.

7. Quitting smoking. Smoking is harmful to the health of not only the smoker but also those around him/her. It is no easy feat to quit. This device can be attached to a pack of cigarettes such that if it is touched or moved, a voice recording of a loved one is there to serve as a reminder and may bring about unexpected results.

8. Weight control. Attaching the device to the refrigerator of dieters will remind them of their goals each time they open the door for food.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and/or control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A multi-purpose alarm device having first and second modes of operation, comprising:
    an alarm generating unit;
    an accelerometer;
    a first input element operable to adjust a first threshold;
    a second input element operable to adjust a second threshold;
    a third input element operable to adjust a predetermined period of time;
    a processor configured to determine an alarm condition based on an output from the accelerometer and issue a control signal to the alarm generating unit to generate an alarm;
    a casing in which the alarm generating unit, the accelerometer, and the processor are housed, wherein the casing has an attachment portion by which the casing is attached to an object, and the attachment portion includes at least one of an adhesive portion, a magnetic portion, and a clamp portion; and
    a mode-selector coupled with the alarm generating unit, the accelerometer, and the processor, the mode-selector being configured to switch the multi-purpose alarm device's operation between the first and second modes of operation,
    wherein, in the first mode of operation, the processor is programmed to issue the control signal if the output exceeds the first threshold, and in the second mode of operation, the processor is programmed to issue the control signal if the output has not exceeded the second threshold for the predetermined period of time.

2. The multi-purpose alarm device according to claim 1, wherein the alarm generating unit is an acousto-optic alarm module that generates an acousto-optic alarm.

3. The multi-purpose alarm device according to claim 1, wherein the alarm generating unit is an audio module that generates a voice prompt.

4. The multi-purpose alarm device according to claim 1, wherein the alarm generating unit is a buzzer module that causes the device to vibrate.

5. The multi-purpose alarm device according to claim 1, wherein the alarm generating unit is a wireless transmission module that wirelessly transmits an alarm signal to a base station.

6. A device operable in a first mode and a second mode, comprising:
    a mode selector configured to make a mode selection to switch the device's operation between the first mode and the second mode;
    an alarm generating unit;
    a first input element operable to adjust a first threshold;
    a second input element operable to adjust a second threshold;
    a third input element operable to adjust a predetermined period of time;
    an accelerometer;
    a processor configured to determine an alarm condition based on an output from the accelerometer and the mode selection, and issue a control signal to the alarm generating unit to generate an alarm; and
    a casing in which the alarm generating unit, the accelerometer, and the processor are housed, and the mode selector is mounted on an exterior of the casing to be accessible for selection.

7. The device according to claim 6, wherein, in the first mode, the processor is programmed to issue the control signal if the output exceeds the first threshold, and in the second mode, the processor is programmed to issue the control signal if the output has not exceeded the second threshold for the predetermined period of time.

8. The device according to claim 6, wherein the casing has an attachment portion that includes at least one of an adhesive portion, a magnetic portion, and a clamp portion.

9. An alarm system comprising:
    a control module for attachment to an object that is operable in a first mode and a second mode,
        the control module having an accelerometer and a wireless transmission module, wherein the wireless transmission module transmits an alarm signal when the accelerometer senses that the object has been moved while the control module is operating in the first mode or when the accelerometer senses no object movement for a predetermined period of time while the control module is operating in the second mode,
        the control module having an input element operable to adjust the predetermined period of time, and
        the control module further having a mode-selector configured to switch the control module's operation between the first mode and the second mode; and
    an alarm module configured to receive the transmitted alarm signal from the control module and issue an alarm upon receipt of the transmitted alarm signal.

10. The alarm system according to claim 9, wherein the control module further includes a casing in which the accelerometer and the wireless transmission module are housed, and the casing has an attachment portion that includes at least one of an adhesive portion, a magnetic portion, and a clamp portion.

11. The alarm system according to claim 9, wherein the alarm module includes at least one of an acousto-optic alarm, an audio module, and a buzzer module for issuing the alarm.

* * * * *